US009500903B2

United States Patent
Xie

(10) Patent No.: US 9,500,903 B2
(45) Date of Patent: Nov. 22, 2016

(54) TRANSFLECTIVE BLUE-PHASE LIQUID CRYSTAL DISPLAY PANEL AND LIQUID CRYSTAL DISPLAY DEVICE

(71) Applicant: BOE TECHNOLOGY GROUP CO., LTD., Beijing (CN)

(72) Inventor: Chang Xie, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 192 days.

(21) Appl. No.: 14/100,473

(22) Filed: Dec. 9, 2013

(65) Prior Publication Data

US 2014/0160403 A1   Jun. 12, 2014

(30) Foreign Application Priority Data

Dec. 10, 2012   (CN) .......................... 2012 1 0530815

(51) Int. Cl.
  *G02F 1/1335* (2006.01)
  *G02F 1/1343* (2006.01)
  *G02F 1/137* (2006.01)

(52) U.S. Cl.
  CPC ... *G02F 1/133555* (2013.01); *G02F 1/134309* (2013.01); *G02F 1/134363* (2013.01); *G02F 2001/13793* (2013.01); *G02F 2001/134381* (2013.01)

(58) Field of Classification Search
  CPC ................ G02F 1/134309; G02F 1/134363; G02F 1/133555; G02F 2001/134381; G02F 2001/13793
  See application file for complete search history.

(56) References Cited

U.S. PATENT DOCUMENTS

| 6,914,656 | B2 | 7/2005 | Sakamoto et al. |
| 7,728,937 | B2 * | 6/2010 | Kume ............... G02F 1/133707 349/114 |
| 7,982,834 | B2 * | 7/2011 | Sakamoto ......... G02F 1/133555 349/114 |
| 8,982,303 | B2 * | 3/2015 | Yu ..................... G02F 1/133555 349/114 |

(Continued)

FOREIGN PATENT DOCUMENTS

| CN | 1474216 A | 2/2004 |
| CN | 101634767 A | 1/2010 |

(Continued)

OTHER PUBLICATIONS

Chinese First Office Action Dated Nov. 27, 2014, Application No. 201210530815.1, 6 Pages.

(Continued)

*Primary Examiner* — Dung Nguyen
(74) *Attorney, Agent, or Firm* — Brooks Kushman P.C.

(57) ABSTRACT

The present invention provides a transflective blue-phase liquid crystal display panel comprising a first substrate, a second substrate, and a liquid crystal layer, wherein the first substrate and the second substrate comprise a plurality of subpixels, and each subpixel comprises a reflective region and a transmissive region, the liquid crystal cell gap of the reflective region is equal to that of the transmissive region, a plurality of first common electrodes and first pixel electrodes that are alternately arranged at equal intervals are set on the part of the second substrate; a second common electrode is set on the part of the first substrate, a second pixel electrode having a via hole at its center is set on the part of the second substrate. In the invention, an alignment layer can be omitted; the display visual angle can be enlarged by designing an electrode structure, and the contrast ratio can be improved, thereby a single cell-gap structure can be attained.

19 Claims, 4 Drawing Sheets

(56) References Cited

U.S. PATENT DOCUMENTS

| | | | |
|---|---|---|---|
| 2003/0218664 A1* | 11/2003 | Sakamoto | G02F 1/133555 347/114 |
| 2008/0068543 A1* | 3/2008 | Mitsui | G02F 1/134309 349/114 |
| 2008/0111956 A1 | 5/2008 | Kim et al. | |
| 2010/0225855 A1* | 9/2010 | Lu | G02F 1/133555 349/96 |
| 2014/0307206 A1 | 10/2014 | Xie | |

FOREIGN PATENT DOCUMENTS

| | | |
|---|---|---|
| CN | 102789101 A | 11/2012 |
| CN | 102809843 A | 12/2012 |

OTHER PUBLICATIONS

Chinese Fourth Office Action Dated Jun. 27, 2016, Application No. 201210530815.1, 6 Pages.

* cited by examiner transmissive region    reflective region

TRANSFLECTIVE BLUE-PHASE LIQUID CRYSTAL DISPLAY PANEL AND LIQUID CRYSTAL DISPLAY DEVICE

CROSS-REFERENCE TO RELATED APPLICATIONS

This application claims priority to Chinese application No. 201210530815.1, filed Dec. 10, 2012, entitled with "Transflective Blue-Phase Liquid Crystal Display Panel and Liquid Crystal Display Device", which is hereby incorporated by reference in its entirety.

TECHNICAL FIELD

The present invention relates to the technical field of liquid crystal displays, and in particular, to a transflective blue-phase liquid crystal display panel and a liquid crystal display device.

BACKGROUND

A liquid crystal display panel is generally formed by laminating a color filter substrate and an array substrate, wherein a liquid crystal layer is encapsulated in the space between the two substrates. Because a liquid crystal molecule itself does not emit light, the display requires a light source to display an image. According to different types of light sources employed, liquid crystal display may be divided into transmissive liquid crystal display, reflective liquid crystal display and transflective liquid crystal display.

Among of them, for a transmissive liquid crystal display, it mainly employs a back light source as the light source, a back light source is set behind the liquid crystal panel, and pixel electrodes on the array substrate are transparent electrodes, which act as a transmissive region, thus it is favorable for the light from the back light source to penetrate through the liquid crystal layer to display an image; for a reflective liquid crystal display, it mainly employs a front light source or an external light source as a light source, and its array substrate employs reflecting electrodes that are formed of a metal or other materials with a good reflection feature as a reflective region, which is suitable for reflecting a light from the front light source or the external light source; and for a transflective liquid crystal display, it may be regarded as a combination of a transmissive liquid crystal display panel and a reflective liquid crystal display panel, wherein not only a reflective region, but also a transmissive region is set on the array substrate, and a back light source and a front light source or an external light source may be utilized at the same time for displaying.

A transmissive liquid crystal display has an advantage that a bright image can be displayed in a dark environment, but it also has a disadvantage that the transmitted light only occupies a small proportion of the light emitted by its back light source, and the utilization of the back light source is not high; in order to increase the display brightness, the luminance of the back light source needs to be increased greatly, thus the energy consumption is very high.

A reflective liquid crystal display has an advantage that sunlight or a front light source may be employed as a light source and the power consumption is relatively low, but it has a disadvantage that an image cannot be displayed in a dark place due to its dependence on an external light source.

A transflective liquid crystal display has the advantages of both transmissive and reflective liquid crystal display panels, it can not only display a bright image in a dark environment, that is, it can be used indoors, but also be used outdoors. Thus, it is widely used in the display equipment of portable mobile electronic products, for example, mobile products such as mobile phone, digital camera, palmtop and GPRS, etc.

Moreover, in the prior art, in order to improve the display quality of a liquid crystal display, that is, to realize a higher contrast ratio, a quicker response time and a wider viewing angle, a blue-phase liquid crystal material with a rapid response feature gains attention gradually. Blue phase is a liquid crystal phase between isotropic state and cholesteryl phase, the temperature range in which it exists is very narrow, being only a temperature span of about 1° C. However, in recent years, it has been found that the temperature range in which blue-phase liquid crystal exists is widened greatly after it is stabilized by a macromolecule, and it can basically meet the application temperature range as a liquid crystal display material. As the most potential next-generation display, the blue-phase liquid crystal display has the following characteristics: 1) blue-phase liquid crystal is isotropic in the case that no voltage is applied, and a blue-phase liquid crystal display has the characteristics of large visual angle and good dark state; 2) theoretical response time of a blue-phase liquid crystal display may reach millisecond level and below, so that the response time may be improved greatly; 3) due to the excellent stability of blue-phase liquid crystal after being stabilized by a macromolecule, it is isotropic in the case that no voltage is applied, so that it does not require an alignment layer that is indispensable for other various liquid crystal display modes, so that the manufacturing cost can be lowered, and the manufacturing process can be simplified.

For the existing transflective liquid crystal displays, positive liquid crystal is generally employed, an alignment layer is required, and the cell gap of the reflective region is not equal to that of the transmissive region, and the display visual angle needs to be increased.

SUMMARY

The technical problem to be solved by the invention is to provide a transflective blue-phase liquid crystal display panel and a liquid crystal display device, thereby a single cell-gap transflective liquid crystal display structure may be implemented, wherein a novel electrode structure is employed, and a transflective display effect is realized. At the same time, the display visual angle can be enlarged by an electrode structure design employed in a reflective region, and the contrast ratio can be improved.

The invention provides the following technical solutions:

A transflective blue-phase liquid crystal display panel, comprising a first substrate, a second substrate that is set opposite to the first substrate, and a liquid crystal layer that is set between the first substrate and the second substrate, wherein the first substrate and the second substrate comprise a plurality of subpixels, and each of the subpixels comprises a reflective region and a transmissive region;

the liquid crystal layer is a blue-phase liquid crystal layer;

the liquid crystal cell gap of the reflective region is equal to that of the transmissive region;

a plurality of first common electrodes and first pixel electrodes, that are alternately arranged at equal intervals, are set on the part of the second substrate corresponding to the transmissive region; and a second common electrode, that is set corresponding to the whole reflective region, is set on the part of the first substrate corresponding to the reflective region, a second pixel electrode, that is set corresponding to the reflective region, is set on the part of the second substrate corresponding to the reflective region, and a via hole is formed at the center of the second pixel electrode.

Preferably, the via hole is a circular via hole.

Preferably, the first substrate comprises:

a first base substrate; and a second common electrode, which is formed on one side of the first base substrate that is adjacent to the second substrate, and set corresponding to the whole reflective region.

Preferably, the second substrate comprises:

a second base substrate;

a reflecting layer, which is formed on one side of the second base substrate that is adjacent to the first substrate, and set corresponding to the whole reflective region;

an insulating layer, which is formed on one side of the second base substrate that is adjacent to the first substrate and lies on the reflecting layer, and which is set corresponding to the whole reflective region and the whole transmissive region;

said plurality of first pixel electrodes and first common electrodes are formed on one side of the insulating layer that is adjacent to the first substrate, and set corresponding to the transmissive region; and the second pixel electrode is formed on one side of the insulating layer that is adjacent to the first substrate, and set corresponding to the reflective region.

Preferably, the width of the first pixel electrode is equal to that of the first common electrode.

Preferably, the liquid crystal cell gap is 3~6 μm; the width of the first pixel electrode and the first common electrode is in the range from about 1 μm to about 3 μm; the interval between the first pixel electrode and the first common electrode is in the range from about 4 μm to about 8 μm; the diameter of the via hole is in the range from about 10 μm to about 25 μm; and the minimum width of the region formed between the via hole and the edge of the second pixel electrode is in the range from about 2 μm to about 6 μm.

Further preferably, the liquid crystal cell gap is 4.4 μm; the width of the first pixel electrode and the first common electrode is 2 μm; the interval between the first pixel electrode and the first common electrode is 6 μm; the diameter of the via hole is 18 μm; and the minimum width of a region formed between the via hole and the edge of the second pixel electrode is 4 μm.

Preferably, the voltage applied to the first common electrode is equal to that applied to the second common electrode.

Preferably, the voltage applied to the first pixel electrode is equal to that applied to the second pixel electrode.

Preferably, the first substrate is a color filter substrate, and the second substrate is an array substrate.

A liquid crystal display device, which comprises the above liquid crystal display panel.

Preferably, the liquid crystal display device further comprises:

a first polarizer, which is formed on one side of the first base substrate that is far from the second substrate, and set corresponding to the reflective region and the transmissive region; and a second polarizer, which is formed on one side of the second base substrate that is far from the first substrate, and set corresponding to the reflective region and the transmissive region.

The above technical solutions of the invention have the following advantageous technical effects:

In the above solutions, since a blue-phase liquid crystal layer is employed, no alignment layer is required for the first substrate and the second substrate, thus the manufacturing process may be simplified; moreover, by designing an electrode structure of the transmissive region and the reflective region, a transflective display effect may be achieved; at the same time, the display visual angle can be enlarged by an electrode structure design employed in a reflective region, and the contrast ratio can be improved. Moreover, a single cell-gap structure of a transflective liquid crystal display device can be realized, and the process complexity can be simplified.

The present invention will be more clearly understood from the description of preferred embodiments as set forth below, with reference to the accompanying drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In order to make the technical problem to be solved, the technical solutions and the advantages of the invention more apparent, descriptions will be given below in conjunction with the drawings and the specific embodiments.

Figure 5:
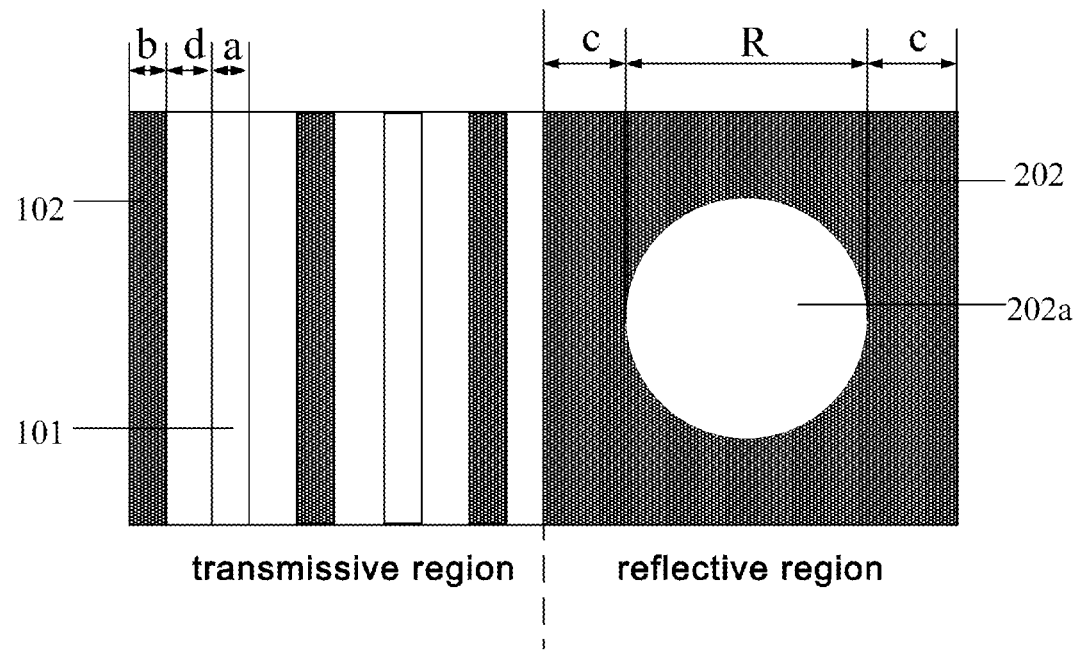
FIG. 5 is a top view showing one embodiment of an electrode structure on the second substrate of a transflective blue-phase liquid crystal display panel according to the invention.

As shown in FIG. 1 to FIG. 5, one embodiment of the invention provides a transflective blue-phase liquid crystal display panel, which includes a first substrate 100, a second substrate 200 that is set opposite to the first substrate 100, and a liquid crystal layer that is set between the first substrate 100 and the second substrate 200, wherein the liquid crystal layer is a blue-phase liquid crystal layer;

wherein the first substrate 100 and the second substrate 200 include a plurality of subpixels, and each subpixel comprises a reflective region and a transmissive region;

the liquid crystal cell gap of the reflective region is equal to that of the transmissive region;

a plurality of first common electrodes 101 and first pixel electrodes 102 that are alternately arranged at equal intervals are set on the part of the second substrate 200 corresponding to the transmissive region;

a second common electrode 201 that is set corresponding to the whole reflective region is set on the part of the first substrate 100 corresponding to the reflective region; and a second pixel electrode 202 that is set corresponding to the reflective region is set on the part of the second substrate 200 corresponding to the reflective region, and a via hole 202a is formed at the center of the second pixel electrode 202 (as shown in FIG. 5).

In the transflective blue-phase liquid crystal display panel according to the embodiment, since its liquid crystal layer employs a blue-phase liquid crystal, and the blue-phase liquid crystal is isotropic in the case that no voltage is applied, it has the characteristics of large visual angle and good dark state; moreover, due to the excellent stability of blue-phase liquid crystal after being stabilized by a macromolecule, it is isotropic in the case that no voltage is applied, thus the transflective blue-phase liquid crystal display panel according to the embodiment does not require an alignment layer that is indispensable for other various liquid crystal display modes, so that the manufacturing cost can be lowered, and the manufacturing process can be simplified.

Moreover, in the transflective blue-phase liquid crystal display panel according to the embodiment, since an electrode structure of In Plane Switching (IPS) mode is employed in the transmissive region, a horizontal electric field is formed in the transmissive region when a voltage is applied. Moreover, a special electrode structure is employed in the reflective region, since a via hole 202a is formed at the center of the second pixel electrode 202, a non-aligned region (i.e., a region corresponding to the via hole 202a) exists between the second common electrode 201 and the second pixel electrode 202, and when a voltage is applied, the electric field lines will be arranged in an inclined direction, and the blue-phase liquid crystal molecules will be deflected in at least two directions and at different tilt angles due to the effect of the inclined electric field, thus the display visual angle will be enlarged, and the contrast ratio will be improved. Moreover, a single cell-gap structure can be attained.

Figure 1:
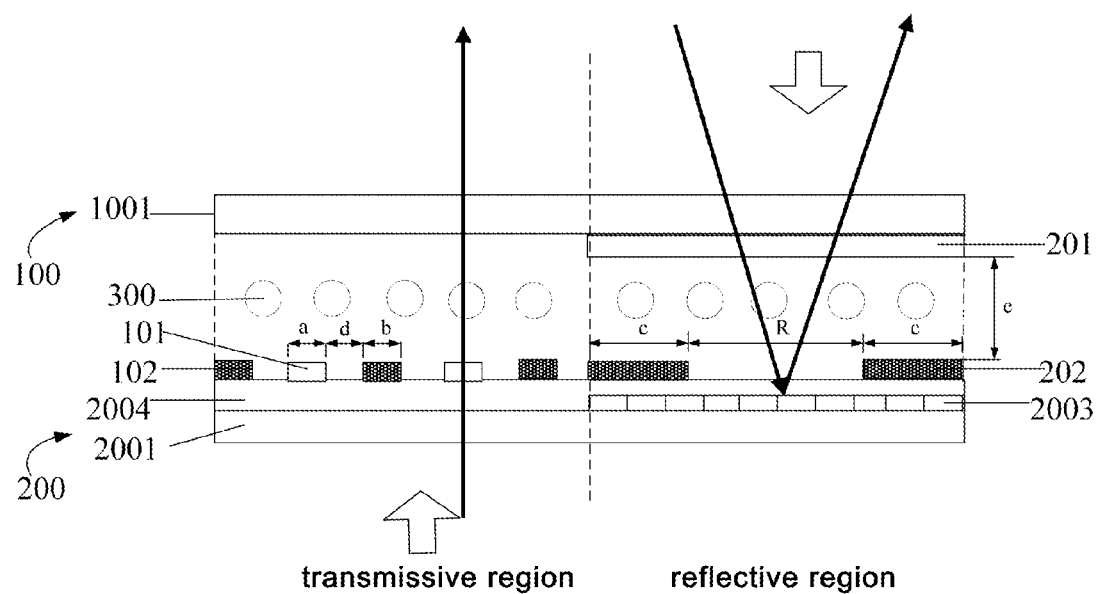
FIG. 1 is a structural representation of a transflective blue-phase liquid crystal display panel according to the invention when no voltage is applied.
Figure 2:
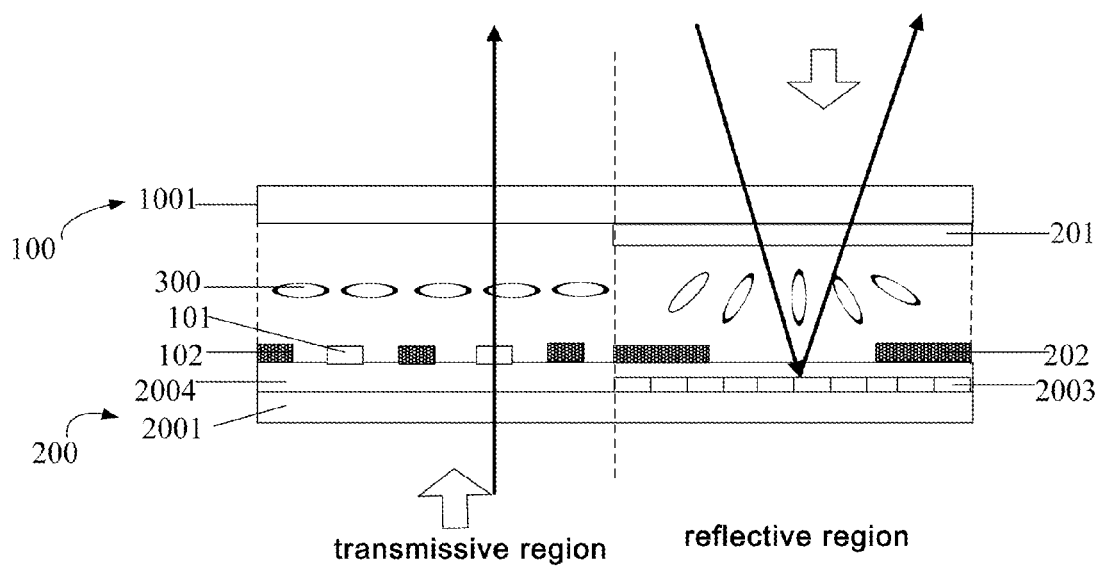
FIG. 2 is a structural representation of a transflective blue-phase liquid crystal display panel according to the invention when a voltage is applied.
Figure 3:
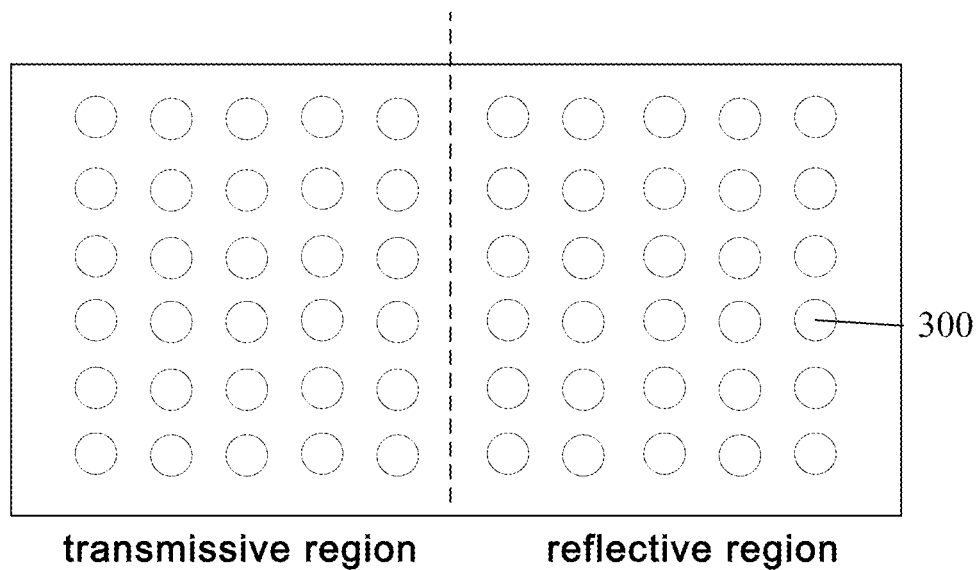
FIG. 3 is a schematic plan view of a transflective blue-phase liquid crystal display panel according to the invention when no voltage is applied.

Specifically, FIG. 1 shows a structural representation of a transflective blue-phase liquid crystal display panel provided in this embodiment when no voltage is applied; and FIG. 3 is a top view showing the arrangement mode of the blue-phase liquid crystal molecules 300 of FIG. 1. FIG. 2 shows a structural representation of the transflective blue-phase liquid crystal display panel provided in this embodiment when a voltage is applied; and FIG. 4 is a top view showing the arrangement mode of the blue-phase liquid crystal molecules of FIG. 2.

As shown in FIG. 1 and FIG. 3, when no voltage is applied, the blue-phase liquid crystal molecules 300 of the transmissive region and the reflective region are isotropic.

Figure 4:
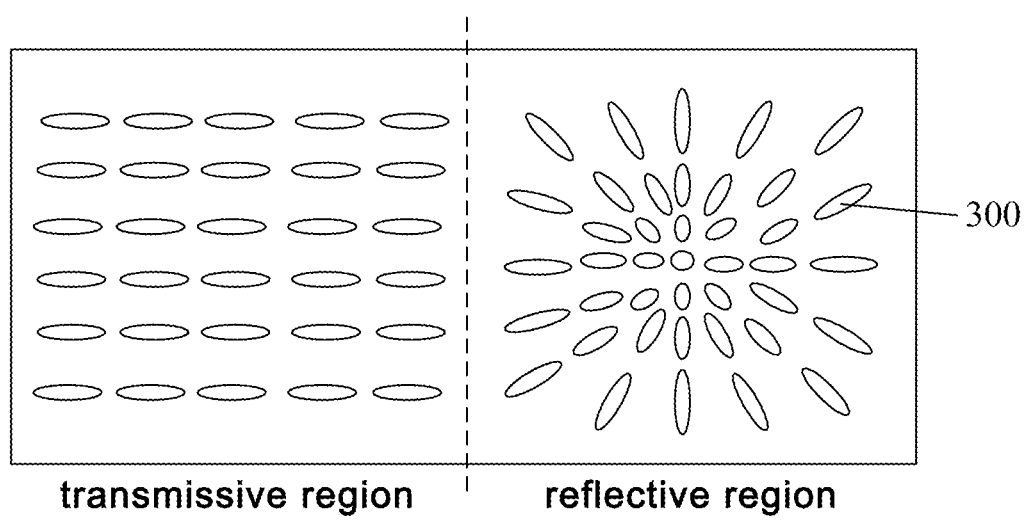
FIG. 4 is a schematic plan view of a transflective blue-phase liquid crystal display panel according to the invention when a voltage is applied.

As shown in FIG. 2 and FIG. 4, when a voltage is applied, in the transmissive region, the blue-phase liquid crystal molecules 300 gradually turn to the horizontal arrangement mode as shown in FIG. 2 and FIG. 4 due to the effect of a horizontal electric field, and a phase delay in horizontal direction is caused.

When a voltage is applied, in the reflective region, the blue-phase liquid crystal molecules 300 gradually turn to the arrangement mode as shown in FIG. 2 and FIG. 4 due to the effect of the inclined electric field, and only a little phase delay in horizontal direction is caused.

If a single cell-gap transflective display effect is to be obtained, by optimizing, in the transmissive region, the width b of the first pixel electrode 102, the width a of the first common electrode 101, the interval d between the first common electrode 101 and the first pixel electrode 102, and in the reflective region, the interval e between the second common electrode 201 and the second pixel electrode 202, and the structure of the second pixel electrode 202, the light passing through the transmissive region may generate more phase delay than that of the reflective region.

It is hypothesized that the light passing through the blue-phase liquid crystal of the transmissive region will generate a large horizontal phase delay $\Delta n1$ under the action of a horizontal electric field, and a small horizontal phase delay $\Delta n2$ is generated by the blue-phase liquid crystal of the reflective region under the action of the inclined electric field. If a transflective display is to be obtained, the amount of phase delay of the light passing through the liquid crystal of the transmissive region needs to be $\Delta n1 \times dn = \lambda/2$, wherein do is the optical distance of the light in the transmissive region to pass through the liquid crystal; the amount of phase delay of the light once passing through the liquid crystal of the reflective region is $\Delta n2 \times dm = \lambda/4$, wherein dm is the optical distance of the light in the reflective region to once pass through the liquid crystal.

For the transmissive region and the reflective region, if the $\Delta n$ of the liquid crystal in the whole transmissive region under the action of the electric field is twice of that of the reflective region, i.e., $\Delta n1/\Delta n2 = 2$, and the optical distance of the light in the transmissive region to pass through the liquid crystal is equal to the optical distance of the light in the reflective region to once pass through the liquid crystal, i.e., dn=dm, in view of the overall effect, $\Delta n1 \times dn = 2\Delta n2 \times dm$; while in the reflective region, the light needs to pass through the liquid crystal of the reflective region twice, thus the amount of phase delay of the light passing through the liquid crystal of the transmissive region and the amount of phase delay of the light passing through the liquid crystal of the reflective region match with each other, and finally a transflective display effect will be attained.

A preferred solution will be provided below, wherein by optimizing, in the transmissive region, the width b of the first pixel electrode 102, the width a of the first common electrode 101 and the interval d between the first common electrode 101 and the first pixel electrode 102, and in the reflective region, the interval e between the second common electrode 201 and the second pixel electrode 202, and the structure of the second pixel electrode 202, a transflective display effect can be achieved.

Specifically, as shown in Figure, FIG. 2 and FIG. 5, in the transflective blue-phase liquid crystal display panel according to the embodiment, the via hole 202a at the center of the second pixel electrode 202 is a circular via hole 202a.

The liquid crystal cell gap (i.e., the interval e between the second common electrode 201 and the second pixel electrode 202) is in the range from about 3 µm to about 6 µm.

The width b of the first pixel electrode 102 is in the range from about 1 µm to about 3 µm, and the width a of the first common electrode 101 is also in the range from about 1 µm to about 3 µm, i.e., the width b of the first pixel electrode 102 is the same as the width a of the first common electrode 101.

The interval d between the first pixel electrode 102 and the first common electrode 101 is in the range from about 4 µm to about 8 µm.

The diameter R of the via hole 202a at the center of the second pixel electrode 202 is in the range from about 10 μm to about 25 μm.

The minimum width of a region formed between the via hole 202a and the edge of the second pixel electrode 202 (i.e., the length shown by c in FIG. 1 and FIG. 5) is in the range from about 2 μm to about 6 μm.

More preferably, the liquid crystal cell gap (i.e., the interval e between the second common electrode 201 and the second pixel electrode 202) is 4.4 μm;

the width b of the first pixel electrode 102 and the width a of the first common electrode 101 are both 2 μm;

the interval d between the first pixel electrode 102 and the first common electrode 101 is 6 μm;

the diameter R of the via hole 202a at the center of the second pixel electrode 202 is 18 μm; and the minimum width c of a region formed between the via hole 202a and the edge of the second pixel electrode 202 is 4 μm.

Figure 6:
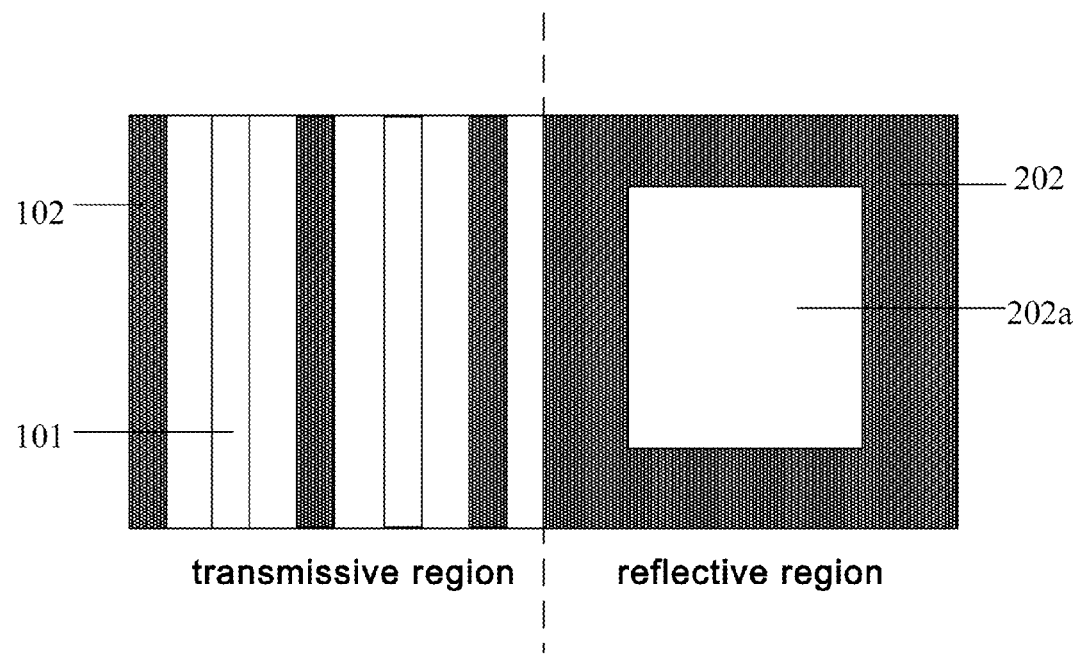
FIG. 6 is a top view showing another embodiment of an electrode structure on the second substrate of a transflective blue-phase liquid crystal display device according to the invention.

It should be appreciated that, in practical applications, the via hole 202a at the center of the second pixel electrode 202 may also be designed as other shapes, for example, rectangle and triangle, etc., and FIG. 6 shows a structural representation when the via hole 202a at the center of the second pixel electrode 202 is rectangular; moreover, the width b of the first pixel electrode 102, the width a of the first common electrode 101 and the interval d between the first common electrode 101 and the first pixel electrode 102 in the transmissive region, and the interval e between the second common electrode 201 and the second pixel electrode 202, etc., in the reflective region, are not limited to the preferred solutions provided in this embodiment.

Moreover, an embodiment according to the present invention further provides a preferred assembling mode of the first substrate 100 and the second substrate 200. As shown in FIG. 1 and FIG. 2, the first substrate 100 includes: a first base substrate 1001; and the second common electrode 201, which is set corresponding to the whole reflective region and formed on one side of the first base substrate 1001 that is adjacent to second substrate 200.

The second substrate 200 includes: a second base substrate 2001; a reflecting layer 2003, which is formed on one side of the second base substrate 2001 that is adjacent to the first substrate 100 and set corresponding to the whole reflective region; and an insulating layer 2004, which is formed on one side of the second base substrate 2001 that is adjacent to the first substrate 100 and lies on the reflecting layer 2003, and which is set corresponding to the whole reflective region and the whole transmissive region; a plurality of first pixel electrodes 102 and first common electrodes 101, which are set corresponding to the transmissive region, are formed on one side of the insulating layer 2004 that is adjacent to the first substrate 100; and the second pixel electrode, which is set corresponding to the reflective region 202, is formed on one side of the insulating layer 2004 that is adjacent to the first substrate 100;

Wherein, the part of the insulating layer 2004 corresponding to the transmissive region lies between the second base substrate 2001 and the first pixel electrode 102, the first common electrode 101; the part of the insulating layer 2004 corresponding to the reflective region lies between the second pixel electrode 202 and the reflecting layer 2003; and the insulating layer 2004 lies on one side of the reflecting layer 2003 that is far from the second base substrate 2001, which can, on one hand, function as an insulating part, and on the other hand, avoid that the cell gap of the transmissive region is unequal to that of the reflective region due to the reflecting layer 2003 set in the reflective region.

Materials, such as glass, quartz and transparent resin, etc., may be selected for the first base substrate 1001 and the second base substrate 2001, which is not limited here.

Moreover, it should be noted that, in the transflective blue-phase liquid crystal display panel provided in this embodiment, the voltage applied to the first common electrode 101 is equal to the voltage applied to the second common electrode 201. The voltage applied to the first pixel electrode 102 may be equal to the voltage applied to the second pixel electrode 202, or they may be unequal. That is, the first pixel electrode 102 and the second pixel electrode 202 may be powered by the single TFT, or they may be powered by two TFTs, respectively.

Preferably, in the transflective blue-phase liquid crystal display panel according to the embodiment, the first substrate 100 is a color filter substrate, and the second substrate 200 is an array substrate.

Another embodiment of the invention provides a liquid crystal display device, which includes the above liquid crystal display panel. The liquid crystal display device may be any product or component with a display function, for example, mobile phone, flat panel computer, TV set, display, laptop, digital photo frame and navigator, etc.

Figure 7:
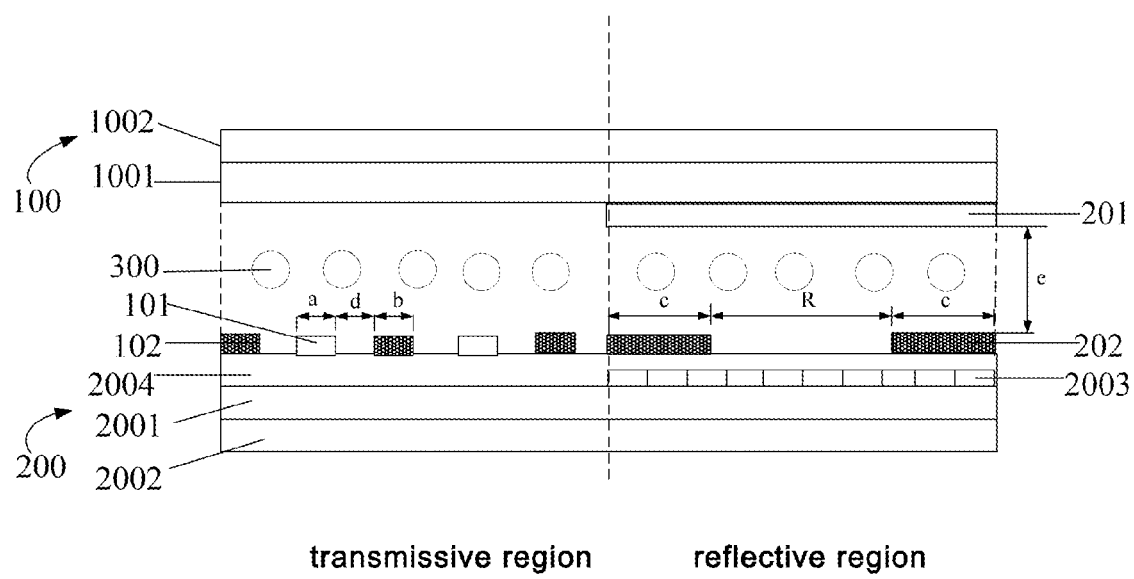
FIG. 7 is a structural representation of a liquid crystal display device according to the invention.

Preferably, as shown in FIG. 7, the liquid crystal display device according to the embodiment further includes: a first polarizer 1002, which is formed on one side of the first base substrate 1001 that is far from the second substrate 200, and set corresponding to the reflective region and the transmissive region; and a second polarizer 2002, which is formed on one side of the second base substrate 2001 that is far from the first substrate 100, and set corresponding to the reflective region and the transmissive region.

The above description only shows some embodiments of the invention, and it should be pointed out that for one of ordinary skills in the art, many improvements and modifications can be made without departing from the principle of the invention, and all these improvements and modifications should fall into the protection scope of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transflective blue-phase liquid crystal display panel, comprising a first substrate, a second substrate that is set opposite to the first substrate, and a liquid crystal layer that is set between the first substrate and the second substrate, wherein the first substrate and the second substrate comprise a plurality of subpixels, and each of the subpixels comprises a reflective region and a transmissive region, wherein:

the liquid crystal layer is a blue-phase liquid crystal layer;

the liquid crystal cell gap of the reflective region is equal to that of the transmissive region;

a plurality of first common electrodes and first pixel electrodes, that are alternately arranged at equal intervals, are set on the part of the second substrate corresponding to the transmissive region; and a second common electrode, that is set corresponding to the whole reflective region, is set on the part of the first substrate corresponding to the reflective region, a second pixel electrode, that is set corresponding to the reflective region, is set on the part of the second substrate corresponding to the reflective region, and a via hole is formed at the center of the second pixel electrode;

wherein the via hole is a circular via hole, and a diameter of the via hole is greater than a minimum width of region between the via hole and an edge of the second pixel electrode.

2. The transflective blue-phase liquid crystal display panel of claim 1, wherein:
the first substrate comprises:
a first base substrate; and
the second common electrode, which is formed on one side of the first base substrate that is adjacent to the second substrate, and set corresponding to the whole reflective region.

3. The transflective blue-phase liquid crystal display panel according to claim 2, wherein:
the first substrate is a color filter substrate; and the second substrate is an array substrate.

4. The transflective blue-phase liquid crystal display panel of claim 1, wherein:
the second substrate comprises:
a second base substrate;
a reflecting layer, which is formed on one side of the second base substrate that is adjacent to the first substrate, and set corresponding to the whole reflective region;
an insulating layer, which is formed on one side of the second base substrate that is adjacent to the first substrate and lies on the reflecting layer, and which is set corresponding to the whole reflective region and the whole transmissive region;
said plurality of first pixel electrodes and first common electrodes, which are formed on one side of the insulating layer that is adjacent to the first substrate, and set corresponding to the transmissive region; and
the second pixel electrode, which is formed on one side of the insulating layer that is adjacent to the first substrate, and set corresponding to the reflective region.

5. The transflective blue-phase liquid crystal display panel according to claim 4, wherein:
the first substrate is a color filter substrate; and the second substrate is an array substrate.

6. The transflective blue-phase liquid crystal display panel of claim 1, wherein:
the width of the first pixel electrode is equal to that of the first common electrode.

7. The transflective blue-phase liquid crystal display panel according to claim 6, wherein:
the first substrate is a color filter substrate; and the second substrate is an array substrate.

8. The transflective blue-phase liquid crystal display panel of claim 1, wherein:
the liquid crystal cell gap is in the range from 3 µm to 6 µm;
the width of the first pixel electrode and the first common electrode is in the range from 1 µm to 3 µm;
the interval between the first pixel electrode and the first common electrode is in the range from 4 µm to 8 µm;
the diameter of the via hole is in the range from 10 µm to 25 µm; and the minimum width of the region formed between the via hole and the edge of the second pixel electrode is in the range from 2 µm to 6 µm.

9. The transflective blue-phase liquid crystal display panel of claim 8, wherein:
the liquid crystal cell gap is 4.4 µm;
the width of the first pixel electrode and the first common electrode is 2 µm;
the interval between the first pixel electrode and the first common electrode is 6 µm;
the diameter of the via hole is 18 µm; and
the minimum width of the region formed between the via hole and the edge of the second pixel electrode is 4 µm.

10. The transflective blue-phase liquid crystal display panel according to claim 9, wherein:
the first substrate is a color filter substrate; and the second substrate is an array substrate.

11. The transflective blue-phase liquid crystal display panel according to claim 8, wherein:
the first substrate is a color filter substrate; and the second substrate is an array substrate.

12. The transflective blue-phase liquid crystal display panel of claim 1, wherein:
the voltage applied to the first common electrode is equal to that applied to the second common electrode.

13. The transflective blue-phase liquid crystal display panel of claim 1, wherein:
the voltage applied to the first pixel electrode is equal to that applied to the second pixel electrode.

14. The transflective blue-phase liquid crystal display panel according to claim 1, wherein:
the first substrate is a color filter substrate; and the second substrate is an array substrate.

15. The transflective blue-phase liquid crystal display panel according to claim 1, wherein:
the first substrate is a color filter substrate; and the second substrate is an array substrate.

16. A liquid crystal display device, wherein:
the liquid crystal display device comprises the liquid crystal display panel of claim 1.

17. The liquid crystal display device of claim 16, further comprising:
a first polarizer, which is formed on one side of the first base substrate that is far from the second substrate, and set corresponding to the reflective region and the transmissive region; and
a second polarizer, which is formed on one side of the second base substrate that is far from the first substrate, and set corresponding to the reflective region and the transmissive region.

18. The transflective blue-phase liquid crystal display panel of claim 1, wherein a projection of a part of the second pixel electrode excepting the via hole onto the second substrate covers a part of the reflective region excepting a projection of the via hole onto the reflective region.

19. The transflective blue-phase liquid crystal display panel of claim 1, wherein the second common electrode spans across the via hole, and the projection of the second common electrode onto the second substrate covers both the second pixel electrode and the via hole.

* * * * *